United States Patent
Tanaka et al.

(10) Patent No.: US 6,850,868 B2
(45) Date of Patent: Feb. 1, 2005

(54) MAINTENANCE SYSTEM FOR ANALYZING INSTRUMENT

(75) Inventors: Koki Tanaka, Kyoto (JP); Koichi Yamamoto, Settsu (JP); Haruhiko Miyagawa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 107 days.

(21) Appl. No.: 10/029,796

(22) Filed: Dec. 31, 2001

(65) Prior Publication Data

US 2002/0107666 A1 Aug. 8, 2002

(30) Foreign Application Priority Data

Feb. 6, 2001 (JP) ....................................... 2001-029927

(51) Int. Cl.[7] ............................................. G05B 19/04
(52) U.S. Cl. ..................... 702/184; 702/183; 702/185; 702/187; 702/188; 702/189
(58) Field of Search ............................ 702/19, 123, 127, 702/126, 179, 183, 184, 185, 187–189, FOR 170–FOR 171, 176, FOR 154–FOR 155; 340/870.2; 714/25, 30, 31, 33, 39, 46, FOR 297; 700/174, 175, 177

(56) References Cited

U.S. PATENT DOCUMENTS

| | | | | |
|---|---|---|---|---|
| 3,854,125 A | * | 12/1974 | Ehling et al. ................. | 714/27 |
| 4,470,304 A | * | 9/1984 | Nusbickel et al. ............ | 73/611 |
| 5,594,663 A | * | 1/1997 | Messaros et al. ........... | 702/184 |
| 5,684,945 A | * | 11/1997 | Chen et al. .................. | 714/20 |
| 6,192,320 B1 | * | 2/2001 | Margrey et al. .............. | 702/84 |
| 6,324,665 B1 | * | 11/2001 | Fay ............................ | 714/736 |
| 2001/0056335 A1 | * | 12/2001 | Ikeda et al. ................. | 702/188 |
| 2002/0059030 A1 | * | 5/2002 | Otworth et al. .............. | 702/19 |
| 2002/0095419 A1 | * | 7/2002 | Parce .......................... | 707/10 |
| 2002/0128786 A1 | * | 9/2002 | Alexander ................... | 702/66 |

\* cited by examiner

*Primary Examiner*—Marc S. Hoff
*Assistant Examiner*—Carol S Tsai
(74) *Attorney, Agent, or Firm*—Manabu Kanesaka (57) ABSTRACT

In a maintenance system for an analyzing instrument, a maintenance department remotely operates a first computer by a second computer to execute an initial inspection and a basic function inspection of the instrument. Then, an abnormality contained in the result information for every executed inspection is specified, and optimum maintenance information for solving the specified abnormality is searched in a server and extracted. Thereafter, the extracted maintenance information is sent to the first computer in the user side. Namely, an operator at the user side is only required to deal with the maintenance of the instrument in accordance with the maintenance information sent from the maintenance department.

6 Claims, 5 Drawing Sheets

MAINTENANCE SYSTEM FOR ANALYZING INSTRUMENT

BACKGROUND OF THE INVENTION AND RELATED ART STATEMENT

The present invention relates to a maintenance system for an analyzing instrument used in a medical field, an industrial field or the like, and more particularly, it relates to a technology for providing maintenance information in order to solve an abnormality which occurs in the analyzing instrument.

Conventionally, maintenance for an analyzing instrument is carried out by a user-side operator. Namely, the operator carries out operations ranging from a generally-operated regular maintenance to operations for diagnosing and solving complicated abnormalities, which suddenly occur, based on an operation manual which is supplied to each of the various analyzing instruments when it is purchased.

However, in the conventional maintenance, there is the following problem. Namely, since the operator is required to diagnose and solve the abnormalities by himself or herself after thoroughly reading the operation manual, there is a disadvantage that labor and time of the operator are wasted.

The present invention has been made in view of the above, and a main object of the invention is to provide a maintenance or repair system for an analyzing instrument, which can provide maintenance or repair information in accordance with an abnormality occurring in the analyzing instrument that carries out the desired analysis.

Further objects and advantages of the invention will be apparent from the following description of the invention.

SUMMARY OF THE INVENTION

To achieve the aforementioned object, a first aspect of the present invention provides a maintenance or repair system for an analyzing instrument for providing maintenance or repair information to solve an abnormality occurring in the analyzing instrument. The maintenance system is basically formed of a first computer provided in the analyzing instrument and a second computer provided in a maintenance department side. The first computer has inspecting means for inspecting the abnormality of the analyzing instrument, executing means for executing an inspection by operating the inspecting means, and first communication means for sending resultant information obtained by executing the inspection by the executing means to the maintenance department through a communication line. The second computer has information storing means, which sequentially stores the result information sent from the first computer and stores maintenance information for solving the abnormalities in advance, searching means which searches maintenance information corresponding to abnormality information contained in the result information sent from the first computer from the information storing means to thereby extract the maintenance information, and second communication means which sends the maintenance information extracted by the searching means to the first computer through the communication line.

Also, according to a second aspect of the invention, in the maintenance system for the analyzing instrument according to the first aspect of the invention, the searching means refers to an abnormality occurrence frequency at a portion where the abnormality occurs from accumulated result information obtained in a past inspection of the analyzing instrument in which the abnormality is detected, to thereby extract optimum maintenance information.

Further, according to a third aspect of the invention, in the maintenance system for the analyzing instrument according to the first aspect of the invention, the second computer includes remote operating means for remotely operating the executing means of the first computer.

The operations of the present invention are as follows. Namely, in the maintenance or repair system for the analyzing instrument according to the first aspect of the invention, the abnormality which has occurred in the analyzing instrument is detected by the detecting means, and the result information including the information about the detected abnormality is sent to the maintenance department side. In the maintenance department side, in correspondence to the abnormality information included in the sent result information, the maintenance information is extracted from the information storing section. Then, the extracted maintenance information is sent to the first computer side. In the first computer side, the maintenance or repair of the analyzing instrument is carried out on the basis of the maintenance information sent from the maintenance department side.

In the maintenance system for the analyzing instrument according to the second aspect of the invention, a past occurrence state of the same abnormality as the detected abnormality is referred to from the accumulated result information stored in the information storing means. Namely, it is determined whether the abnormality occurred suddenly and minor one or was frequent and critical one, and the adequate maintenance information is extracted.

In the maintenance system for the analyzing instrument according to the third aspect of the invention, the first computer is remotely operated in the maintenance department side to execute the inspection.

DETAILED DESCRIPTION OF PREFERRED EMBODIMENTS

Hereunder, embodiments of the invention will be explained with reference to the accompanied drawings. In this embodiment, a maintenance or repair system used for a spectrophotometer is explained as an example. However, the invention is not limited to the maintenance system for the spectrophotometer, and can be applied to various analyzing instruments. Incidentally, the embodiment will be explained on the premise that a user, who has purchased a spectrophotometer, is registered as a user in a manufacturer and a maintenance department of the manufacturer is asked to periodically carry out an inspection of the spectrophotometer.

Figure 1:
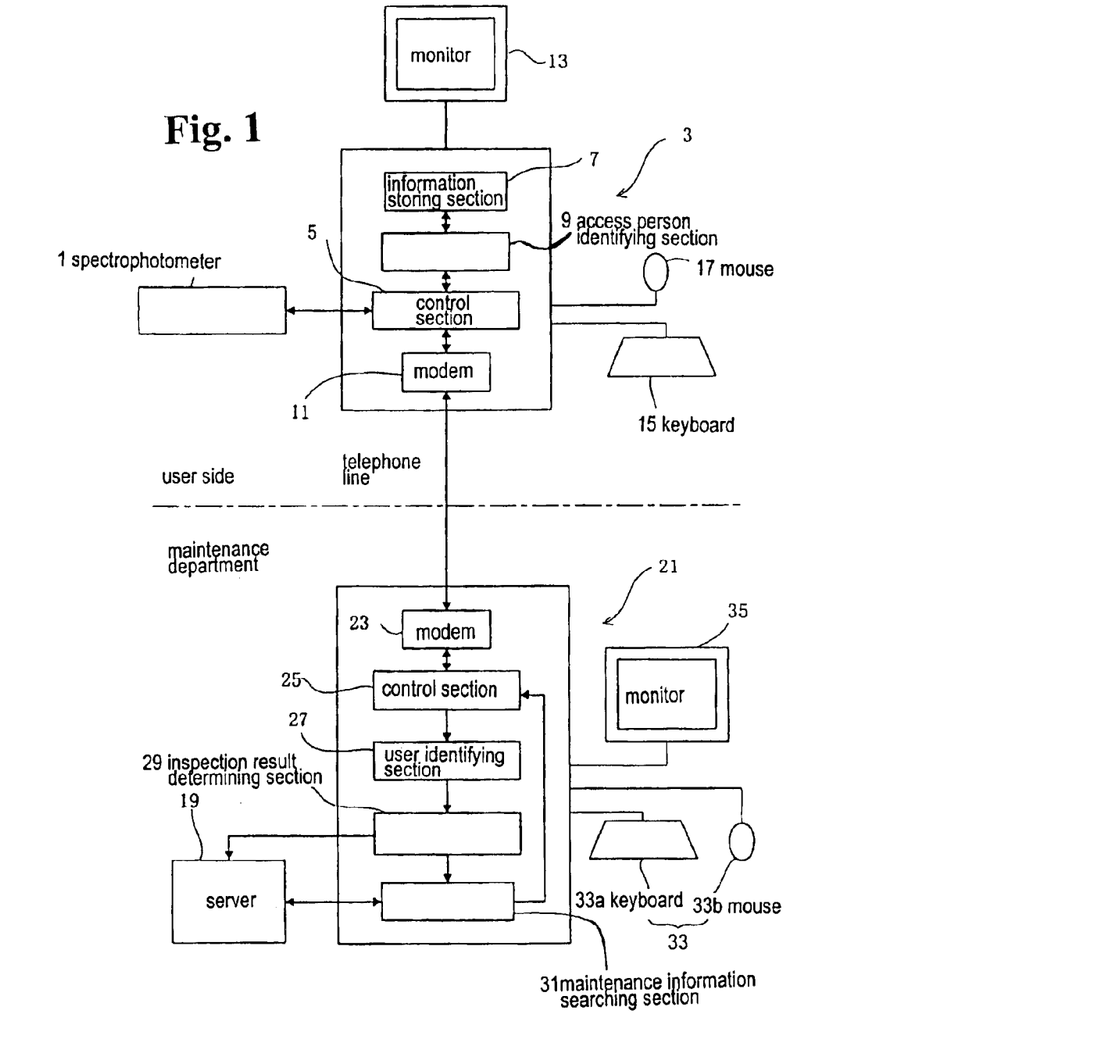
FIG. 1 is a block diagram showing a structure of a maintenance system for an analyzing instrument of an embodiment of the invention.

FIG. 1 is a block diagram showing a structure of a main section of the maintenance system for the spectrophotometer according to the embodiment of the invention.

As shown in FIG. 1, in the maintenance system for the spectrophotometer of the embodiment of the invention, a spectrophotometer 1 and a first computer 3 connected to the spectrophotometer 1 are disposed in the user side, and a server 19 and a second computer 21 connected to the server 19 are disposed in the maintenance department side. Then, the first computer 1 and the second computer 21 are connected via a public telephone line as a communication line. Incidentally, the communication line is not limited to the telephone line, and for example, it can be an interface or cable.

Firstly, a structure of the system in the user side and functions thereof will be explained.

The spectrophotometer 1 is a device which is generally used, and although not shown in the figures, the spectrophotometer 1 is formed of a light source, a spectroscope, a sample chamber, a detector and an indicator.

The first computer 3 includes a control section 5, an information storing section 7, an access person identifying section 9, a modem 11 as first communication means, a monitor 13 for displaying various information by images, and a keyboard 15 and a mouse 17, which are provided for inputting information and operating the computer.

The control section 5 wholly carries out an execution, operation and control of the inspection of the spectrophotometer 1, and the control of the first computer itself. Incidentally, the control section 5 corresponds to inspecting means and executing means of the invention.

The information storing section 7 stores the system for operating and controlling the spectrophotometer 1, information about the user itself, and information about the maintenance department which is contacted from the outside through the telephone line. As the information about the user, for example, a user's name, a communication access code, a password, a serial number of the analyzing instrument or the like are registered. Also, as the information about the maintenance department, for example, an access code, password or the like are registered.

The access person identifying section 9 verifies whether the access code and the password of the person who accesses through the telephone line coincide with the ones registered in the information storing section 7. Namely, if the access code and the password are different from the registered ones as a result of comparing with the registered information, the access is denied. If the access code and the password coincide with the registered ones, the access is allowed, so that the information being sent is received at the first computer 3, and at the same time, the first computer 3 can be operated from the outside.

Namely, the spectrophotometer 1 can be remotely operated only when the access from the outside is the maintenance department. Then, the maintenance department side operates the first computer 3, so that the inspections of the spectrophotometer 1 can be carried out.

As the inspections of the spectrophotometer 1, for example, the initial inspection, which is generally executed, and a basic function inspection are carried out. The initial inspection is also required when the spectrophotometer 1 is used, and for example, the initial inspection includes an inspection for the system, such as an initialization of LSI and a memory inspection of ROM and RAM, and an inspection for a driving mechanism, such as a motor.

Also, the basic function inspection includes inspections for eleven items, that is, an inspection record at the time of generally initializing the spectroscope, a wavelength accuracy, a wavelength reproducibility, resolution, a stray light, a photometry accuracy, a photometry repeatability (photometric value reproducibility), a drift stability, a baseline flatness, a noise level and a transmittance 0% line.

Incidentally, regarding the basic function inspection, it is possible to execute the regular inspection. In this case, the user can select only items which are necessary for the regular inspection, and also, the period of the inspection can be set and executed in the unit, such as day, week, and month.

Figure 2:
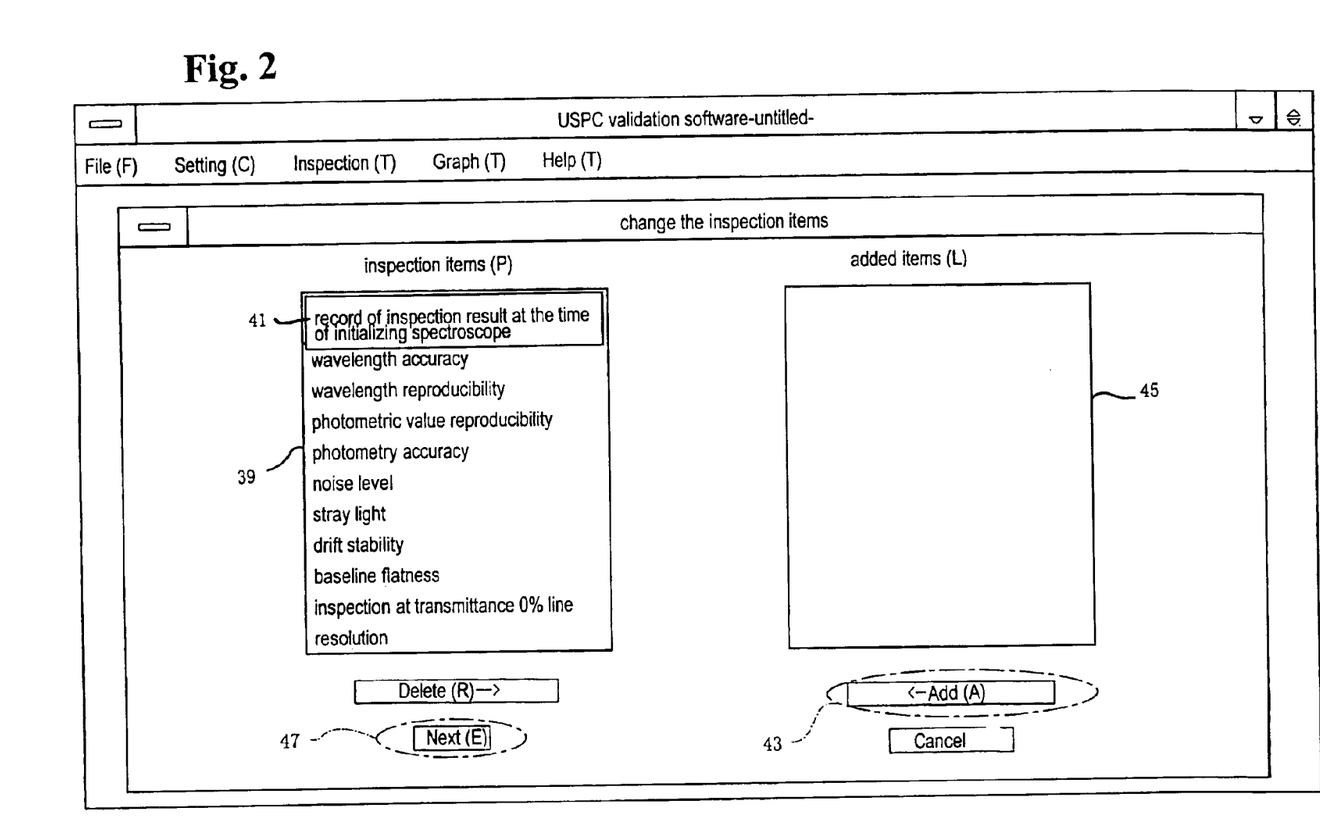
FIG. 2 is an explanatory view showing an input screen for selecting inspection items in a regular inspection.

Setting of the regular inspection is carried out by the following steps. Firstly, as shown in FIG. 2, the eleven inspection items are displayed in advance in an inspection item list box 39 of a menu screen, and the user operates a mouse 17 to move a cursor to the desired inspection item chosen from the eleven items and click the item. Then, the selected item 41, for example, "a record of inspection result at the time of initializing the spectroscope", is displayed in a reverse form. Then, the cursor is moved to an add button 43, and the add button 43 is clicked, so that the information object item is added in an added item list box 45.

Figure 3:
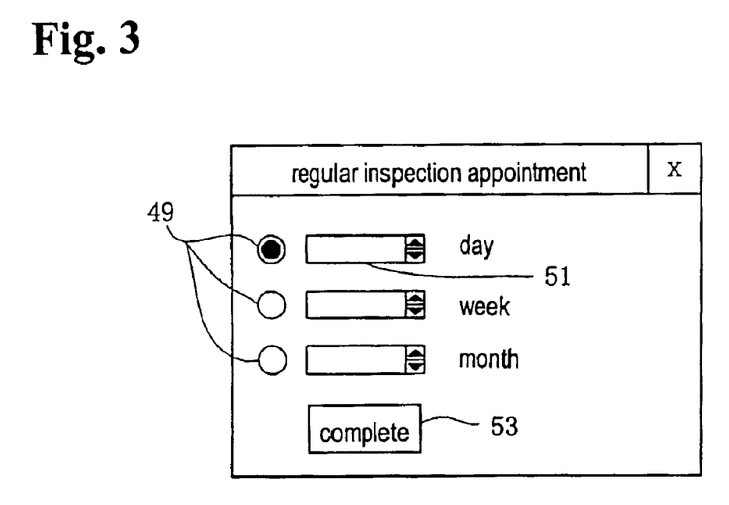
FIG. 3 is an explanatory view showing an input screen for setting an execution period of the regular inspection.

After the selection of the inspection item, when a "next" button 47 is clicked, the screen is switched to a setting input screen of a regular inspection appointment as shown in FIG. 3. Then, one of the units, that is, day, week, or month is selected from period selecting sections 49, and a check mark is entered in the selected unit. At the same time, a desired number of the period is entered in a number entry box 51. When the input is completed, a "complete" button 53 is clicked. Accordingly, the regular inspection information is stored in the information storing section 7 of the first computer 3, and sent to the maintenance department side through the telephone line.

Also, in the first computer side 3, the result information obtained by executing the inspection is also sent to the maintenance department through the telephone line.

Next, the structure of the maintenance department side which is the characteristic portion of the maintenance system of the invention will be explained.

A server 19 stores information about the user, who purchased the spectrophotometer 1, and the maintenance information on the spectrophotometer 1, and sequentially stores the inspection result information sent from the first computer 3 through the second computer 21. Incidentally, the server 19 corresponds to information storing means of the invention.

Information about the user includes the same information as the one (for example, user's name) registered in the first computer 3, the regular inspection information about the user, the accumulated inspection result information on the executed inspections sent from the first computer 3, and a maintenance history. Then, these are collected into one for every user and stored in the user exclusive file.

In the maintenance information, the information about the method of dealing with the abnormality which has occurred and the steps of operating the instrument are classified for every detection item and stored in the document file format.

The second computer 21 is formed of a modem 23 as second communication means, a control section 25, a user identifying section 27, an inspection result determining section 29, a maintenance information searching section 31, an operating section 33 which is formed of a keyboard 33a and a mouse 33b as remote operating means, and a monitor 35 for displaying the information or the like.

The control section 25 wholly operates and controls the first computer 3 and the server 19 through the operating section 33. Also, the control section 25 manages the schedule of executing the regular inspection of the spectrophotometer 1 in the user side.

The user identifying section 27 verifies whether the access code and the password of the access user coincide with the user information registered at the time of purchasing the spectrophotometer 1. When the access code and the password coincide with the registered user information, the access is allowed. When the access code and the password are different from those of the registered user information, the access is denied.

When the information about the access user coincides with the registered user information, the inspection result determining section 29 determines whether the sent inspection result information includes abnormal information. If there is no abnormality as a result of determination, the inspection result information is sent to the server 19 and additionally stored in the user exclusive file. If there is abnormality as a result of the determination, the inspection result information is sent to the maintenance information searching section 31.

The maintenance information searching section 31 searches and extracts the file of the maintenance information corresponding to the inspection item which was abnormal among the information on the inspection result sent from the inspection result determining section 29. At this time, in extracting the file, for example, "data of occurrence of the abnormality in the same item in the past" is also referred to from the accumulated result information of the user in the server 19. By doing this, it can be determined whether the abnormality occurs suddenly and is minor or is frequent and fatal, and the file which is most suitable to the abnormal occurrence condition can be selected and extracted.

Hereinafter, a case when the abnormality has occurred in the inspection item of the baseline flatness will be explained as an example. Incidentally, although the actual determination of the abnormality is carried out by using the digitalized value, here, for the purpose of the explanation, it will be explained with reference to the drawings.

In the inspection of the baseline flatness, for example, as the measurement mode, there are set and executed the following measurement conditions, that is, the acceptance range of the absorbance and the measurement absorbance is ±0.002 Abs; the scan speed is low; the slit width is 2.0; and the measurement range (wavelength) is 195.0 to 900.0 nm. Then, it is supposed that the result shown in FIG. 4 is obtained.

Figure 4:
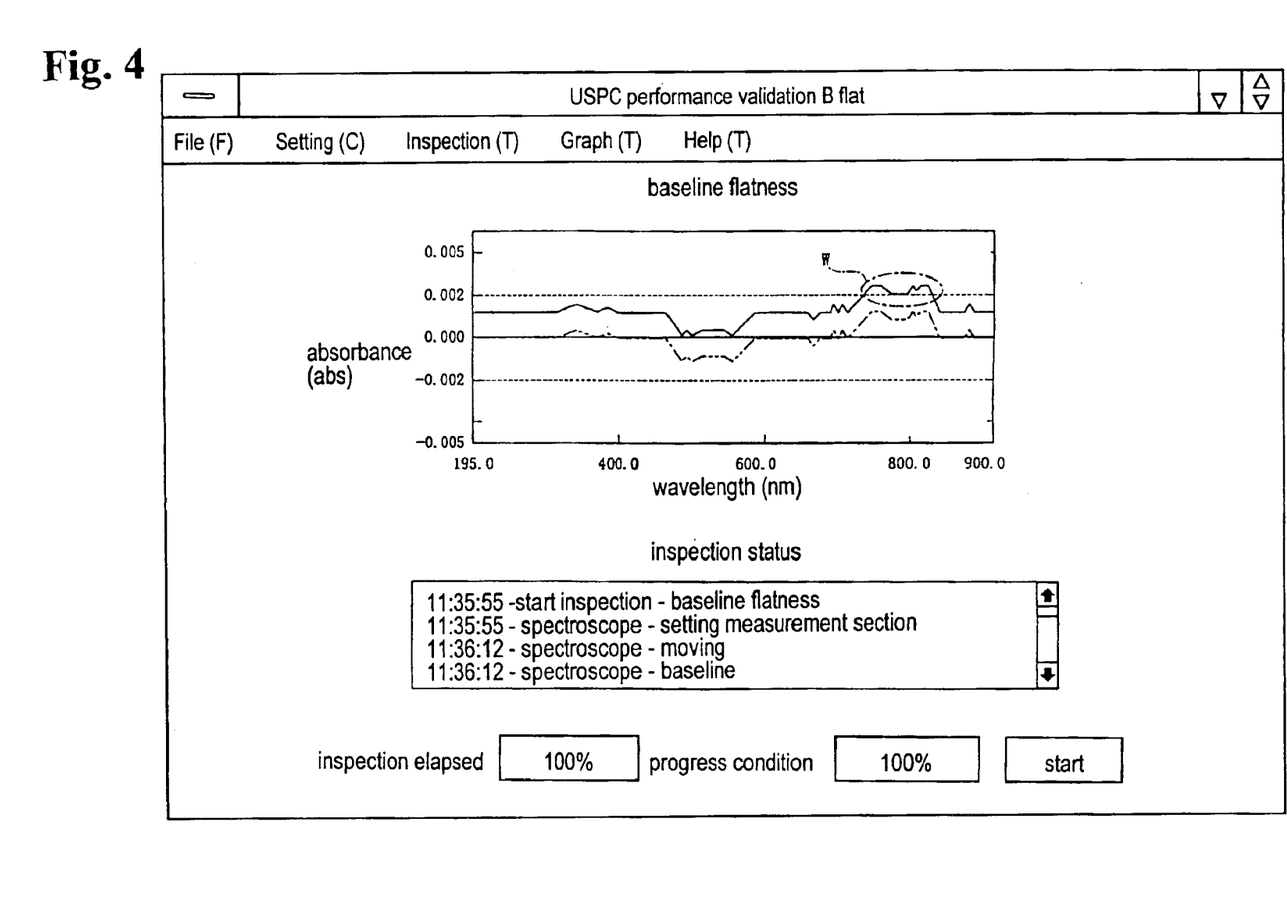
FIG. 4 is an explanatory view in which a detection result of a baseline flatness in a function test is displayed in a monitor.

As the waveform, as shown in FIG. 4, although the flatness substantially maintains ±0.002 Abs as the acceptance range, the detected waveform is overall shifted to the plus direction from the reference point at 0.000 Abs, and a part of the waveform in a region W encircled by a one-dotted line exceeds 0.002 Abs as the acceptance range. Therefore, this is determined as the abnormality.

At this time, the list of the baseline flatness is referred to from the past accumulated result information stored in the server 19, and it is determined whether the abnormality in the baseline flatness occurred in the past.

As a result of the determination, if the abnormality did not occur in the past, the abnormality is determined as a sudden and minor abnormality. Then, the server 19 extracts the file of "measurement circuit minor adjustment" which adjusts such that the waveform is shifted in the direction of the reference point at 0.000 Abs to be the waveform shown by a two-dotted line in FIG. 4 so that the measurement absorbance stays within the acceptance range.

On the contrary, as a result of referring to the accumulated result information, if the same abnormality continuously occurred several times, the abnormality is determined as the fatal abnormality due to a defect of IC in the measurement circuit, so that the file of "steps for replacing IC" is selected.

Namely, by referring to the past occurrence state of the specific abnormality, the optimal file of the maintenance information can be extracted from the server 19. Incidentally, the maintenance information searching section 31 corresponds to searching means of the invention.

Figure 5:
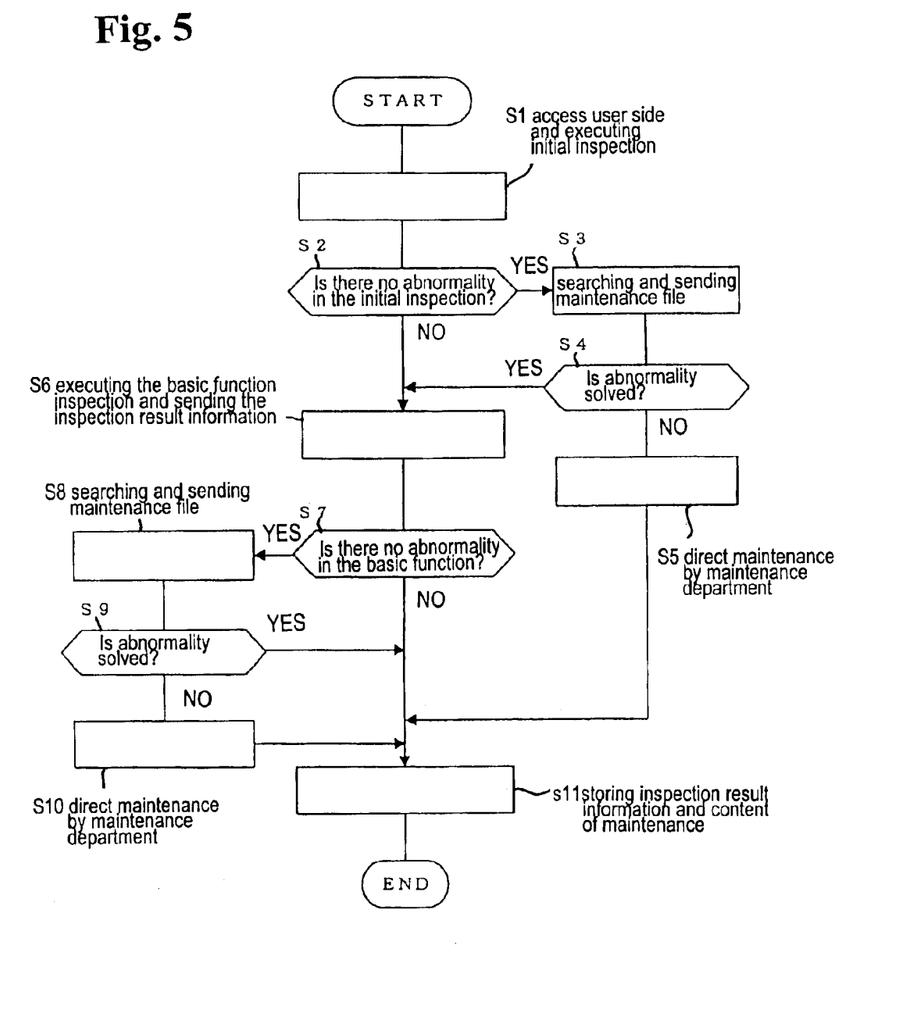
FIG. 5 is a flow chart showing steps using the maintenance system according to the embodiment of the invention.

Next, series of operations of the entire maintenance system of the spectrophotometer 1 having the aforementioned structure will be explained with reference to the flow chart of FIG. 5. Incidentally, the operations will be explained from the time after the user preliminarily finishes the user registration and the condition settings for executing the regular inspection by the maintenance department.

Step S1: Access to user side and execution of initial inspection

The maintenance department operates the second computer 21 to access the first computer 3 in the user side, and executes the initial inspection of the spectrophotometer 1. At the same time, the inspection result information is obtained from the first computer 3.

Step S2: Is there no abnormality in the initial inspection?

If abnormality in one of the systems and driving mechanism is found in the inspection result information, the operation proceeds to step S3. If the abnormality is not found, the operation proceeds to next step S6.

Step S3: Searching and sending of maintenance file In view of the sent inspection result information, the maintenance file corresponding to the abnormal portion is searched at the server 19. The maintenance file extracted by the search is sent together with the maintenance notice to the first computer 3 side.

Step S4: Is the abnormality solved?

Based on the content of the maintenance file sent to the first computer 3, the user by himself or herself deals with the maintenance or repair of the system of the spectrophotometer 1. If the abnormality is not solved, the operation proceeds to step S5. If the abnormality is solved, the operation proceeds to step S6.

Step S5: Direct maintenance or repair by the maintenance department

As a result of the maintenance by the operator in the user side, if the abnormality regarding the initial inspection is not solved, the operator directly contacts the maintenance department to have a maintenance or repair by the on-site service. Incidentally, the maintenance information directly received at the maintenance department is stored as the maintenance history in the user exclusive file.

Step S6: Executing basic function inspection and sending inspection result information The basic function inspection is executed regarding the inspection items, which are selected and set for the regular inspection from the eleven basic inspection items, and the inspection result information is sent to the second computer 21.

Step S7: Is there no abnormality in the basic function?

If abnormality is found in the basic function, the operation proceeds to step S8, and if there is no abnormality, the operation proceeds to step S11.

Step S8: Searching and sending maintenance file

In view of the sent inspection result information, the maintenance file corresponding to the abnormal portion is searched from the server 19. The maintenance file extracted by the search is sent together with the maintenance notice to the first computer 3 side.

Step S9: Is the abnormality solved?

Based on the content of the maintenance file sent to the first computer 3, the operator of the user side deals with the maintenance of the spectrophotometer 1. Accordingly, if the abnormality is not solved, the operation proceeds to step S. If the abnormality is solved, the operation proceeds to step S11.

Step S10: Direct maintenance by the maintenance department

As a result of the maintenance by the operator, if the abnormality is not solved, the operator directly contacts the maintenance department to have the maintenance or repair by the on-site service. Incidentally, the maintenance information directly received by the maintenance department is stored as the maintenance history in the user exclusive file.

Step S11: Storing inspection result information and content of the maintenance

After steps S1 to S11 are finished, the inspection results and the content of the maintenance carried out by that time are stored as a history in the server 19.

In the maintenance system of the spectrophotometer 1 of the embodiment described above, if the user information and setting of the regular inspection regarding the basic function inspection items are registered when the user purchased the spectrophotometer, the user can have the regular inspection of the spectrophotometer 1 by the maintenance department of the manufacturer side. Namely, it is set such that the first computer 3 is remotely operated by the second computer 21 to execute the regular inspection of the spectrophotometer. Also, if the abnormality is found in the spectrophotometer 1 in the regular inspection, frequency of occurrence of the abnormality is referred to from the accumulated result information regarding the inspections of the spectrophotometer executed in the past, so that the optimal maintenance or repair information is searched from the server 19 and sent to the user side through the telephone line. Namely, since the user side is only required to prosecute the maintenance based on the sent maintenance information, it is not necessary to diagnose and deal with the abnormal portion from the beginning, resulting in preventing disadvantage that the labor and time are wasted.

The present invention is not limited to the above embodiment, and can be modified as follows.

(1) Although only one spectrophotometer 1 is connected to the maintenance system in the aforementioned embodiment, a plurality of analyzing instruments of the same or different kinds can be maintained at the same time. Namely, by forming an in-company LAN, a plurality of analyzing instruments is connected to the first computer 3, and the maintenance information of each analyzing instrument is stored in the server 19 in advance.

(2) Although the file regarding "step for replacing IC", which requires the replacement of the IC due to the fatal abnormality, is extracted and sent in the inspection of the baseline flatness of the spectrophotometer 1 in the aforementioned embodiment, information about the abnormal part, such as the IC which needs to be replaced, for example, a stock status of the parts in the maintenance department side can be indicated, and sent to the user by an electronic mail attached with a document file of the order format.

(3) Although the regular inspection by the maintenance department of the manufacturer side confirms the occurrence of the abnormality and provides the maintenance information in the aforementioned embodiment, the abnormality which has occurred at the time of using the analyzing instrument, such as the spectrophotometer 1, can be checked by the basic function inspection in the user side, and the resultant information thereof can be sent to the maintenance department to thereby obtain the optimum maintenance information.

(4) Although the inspection items are limited to those of the initial inspection and the basic function inspection in the aforementioned embodiment, other inspection items which are peculiar to the analyzing instrument can be added and inspected if necessary.

(5) In the aforementioned embodiment, after determining the abnormality, the past occurrence frequency of the abnormality is referred to from the accumulated result information. Furthermore, product lives of the main parts forming the abnormal portion, for example, product lives of the constituent parts and the history of replacing the parts in each analyzing instrument can be stored in the server, and these can be referred to specify the abnormal portion.

(6) Although only the maintenance information regarding the abnormality which has occurred at the time of the initial inspection and the basic function inspection is stored in the server 19 in the aforementioned embodiment, the current or updated maintenance information, such as maintenance information corresponding to the special abnormality or the maintenance information when the abnormality that has not occurred conventionally is solved, can be stored. Also, the fact that such current maintenance information is added to the server can be notified to the registered user by the electronic mail.

As described above, according to the first aspect of the invention, the maintenance department side can specify the abnormal portion from the result of the inspection of the analyzing instrument, and easily provide the operator at the user side with the maintenance information for solving the specific abnormality detected from the maintenance information stored in advance. Namely, the operator deals with the maintenance based on the maintenance information provided from the maintenance department, so that the operator can solve the abnormality of the analyzing instrument in a short time.

Also, according to the second aspect of the invention, by referring to the abnormality occurrence frequency of the portion where the abnormality occurred from the accumulated result information of the inspections which were executed in the past, the level of the abnormality can be determined. Namely, it can be determined whether the abnormality can be solved by the minor adjustment of the analyzing instrument or the specific parts are required for replacement.

Furthermore, according to the third aspect of the invention, the inspection of the analyzing instrument and the maintenance thereof can be carried out by the remote operation by the maintenance department side.

While the invention has been explained with reference to the specific embodiments of the invention, the explanation is illustrative and the invention is limited only by the appended claims.

What is claimed is:

1. A maintenance system for an analyzing instrument, comprising:
 a first computer provided in an analyzing instrument and including inspecting means for inspecting abnormality of the analyzing instrument, executing means for executing an inspection by operating the inspecting means, and first communication means connected to the first computer for sending result information obtained by executing the inspection by the executing means, and a second computer provided in a maintenance department side and including information storing means sequentially storing the result information sent from the first computer through a communication line and storing in advance maintenance information for solving abnormalities, searching means for searching the maintenance information corresponding to abnormality information contained in the result information sent from the first computer from the information storing means to extract the maintenance information, and second communication means connected to the searching means for sending the maintenance information extracted by the searching means to the first computer through the communication line.

2. A maintenance system for an analyzing instrument according to claim 1, wherein said searching means refers to an abnormality occurrence frequency at a portion where the abnormality occurs from accumulated result information obtained in a past inspection of the analyzing instrument in which the abnormality is detected to thereby obtain optimum repair information.

3. A maintenance system for an analyzing instrument according to claim 1, wherein the second computer includes remote operating means for remotely operating the executing means of the first computer.

4. A maintenance system for an analyzing instrument according to claim 1, further comprising inspection result determining section for receiving the result information sent from the first computer and determining if the result information contains the abnormality, said inspection result determining section sending the result information to the storing means if there is no abnormality and to the searching means if there is the abnormality.

5. A maintenance system for an analyzing instrument according to claim 4, further comprising access person identifying means provided in the first computer for identifying an access person, and user identifying means provided in the second computer for identifying a user.

6. A maintenance system for an analyzing instrument according to claim 5, further comprising a spectrophotometer connected to the first computer for analyzing.

* * * * *